July 9, 1968 R. A. MENELLY 3,392,298
FLUORESCENT LAMP USING AN INDIUM-MERCURY AMALGAM BAND
FOR PRESSURE CONTROL
Filed Aug. 31, 1962 2 Sheets-Sheet 1

RICHARD A. MENELLY
*INVENTOR.*

BY *Lawrence Burns,*
ATTORNEY

RICHARD A. MENELLY
INVENTOR.

United States Patent Office 3,392,298
Patented July 9, 1968

3,392,298
FLUORESCENT LAMP USING AN INDIUM-MERCURY AMALGAM BAND FOR PRESSURE CONTROL
Richard A. Menelly, Danvers, Mass., assignor to Sylvania Electric Products Inc., a corporation of Delaware
Filed Aug. 31, 1962, Ser. No. 220,714
2 Claims. (Cl. 313—109)

This invention relates to electric vapor discharge lamps, especially to those in which the vapor is mercury, and particularly to fluoroescent lamps of such types.

Such discharge lamps generally also contain an inert gas, and when the vapor is mercury, have their greatest efficiency of output of ultra-violet light at a mercury pressure of about 3 to 6 microns. In a fluorescent lamp of the low pressure discharge type, the ultraviolet excites a phosphor coating, and so the efficiency in that lamp also is greatest at a mercury pressure of about 3 to 6 microns.

The mercury vapor pressure in the lamp rises with temperature, and if the mercury is present in the pure state, will reach 3 microns at a temperature of about 32° C. at the coolest part of the lamp envelope. In many fixtures, especially the enclosed types such as used in gasoline stations and in so-called troffer ceiling fixtures, the lamps operate at temperatures considerably above 40° C., with consequent reduction in efficiency, unless special cooling means is provided such as shields at the ends of the tube, heat sinks in contact with a part of the tube, grooves along the length of the tube, or the like.

Such means are less effective when the fixture is completely enclosed or the ambient temperature very high.

Instead of achieving the reduced mercury pressure by cooling a part of the tube, the suggestion has been made to keep the pressure low by adding the mercury in the form of an amalgam, since the pressure of mercury over an amalgam is lower than over pure mercury.

An amalgam of cadmium and mercury has been suggested, but the proportions of cadmium and mercury in the amalgam are extremely critical and have to be precisely fixed for each operating temperature of the lamp for good results, since the graph of efficiency against temperature had a very narrow peak. A different amalgam was necessary for each operating temperature. Moreover, any mercury which may leave the amalgam during operation of the lamp would not be readily reabsorbed, so the lamp on being shut off, would not be ready for the next start.

An even more serious disadvantage of the cadmium-mercury amalgam is the sharp reduction in lamp efficiency during life. The gain in efficiency by the use of the amalgam is less than the drop in efficiency after a few hundred hours life, because of the effect of the amalgam on the phosphor. The purpose of the use of the amalgam is thus defeated, and after a few hundred hours of operation the efficiency of the lamp may be less than that of a lamp without the cadmium.

We have unexpectedly discovered that much more effective results can be obtained by the use of a small amount of indium in the lamp, preferably on the lamp tube. The indium can be affixed to the bulb in a thin layer at some convenient spot, usually in the coolest portion, for example as a ring around the inner surface of the lamp tube near the middle of the latter, and the mercury added to the lamp separately during the usual processing. We have discovered that the merccry will eventually deposit on the indium during the operation of the lamp, or even while the lamp is not in operation. We have found that even without operating the lamp, all the mercury in it will deposit on the indium in about 8 hours, apparently forming an alloy therewith.

The resultant lamp has many unexpected advantages. One of these is that it is operable at substantially peak efficiency over a much wider range of temperatures than either the usual very high output lamp with shields behind the electrodes or the lamp with the cadmium amalgam.

Another advantage is that the lamp of my invention maintains its efficiency over a comparatively wide range of mercury contents in the alloy. That is important because during normal operation of a fluorescent lamp about half the mercury is "used up" by reaction with other materials inside the lamp. Thus the lamp of our invention needs to operate over a range including both the original amount of mercury in the lamp and the final amount at the end of normal life.

We have discovered that the broad range of operating temperatures within which high efficiency can be obtained when indium is present, is only obtained when the proportions are such that the indium-mercury alloy is in the combination solid-liquid phase or in the high-indium portion of the liquid phase, and that the range is narrower when the alloy is in the entirely solid phase. The useful indium alloys are therefore confined to those containing from about 20% mercury to about 50% mercury by weight, the remainder being indium.

We have discovered that by confining the indium to the above range, thereby assuring that the alloy is present in the proper phase, and not in the solid phase, we get the unexpected result of operability of the lamp at high efficiency over a very broad range of temperature. The peak of the graph of efficiency vs. temperature is not only shifted toward higher temperatures, but it is greatly broadened, thereby obviating the necessity of using different proportions for each temperature range. A single lamp will be satisfactory over a wide operating range; whereas with the amalgams previously known several different lamps, each with different proportions in its amalgam, would be necessary to cover all the operating conditions.

Thus although applicant uses indium, an element previously suggested in a general way for an amalgam, he uses it in different proportions and in a different physical condition than would have been used with cadmium and other previous amalgams and obtains an altogether unexpected effect.

Moreover, for best results, the indium should be present originally as a coating on the inside surface of the lamp tube, preferably as a ring near its middle portion, although it can instead be added to the lamp directly as an alloy with mercury, if desired. However, the use of the ring fixes the position of the indium, since the indium has a very low vapor pressure, and will not evaporate with the mercury.

A feature of the invention is its good maintenance of light output during life.

Other objects, advantages and features of the invention will be apparent from the following specification, taken in connection with the accompanying drawing in which.

Figure 1:
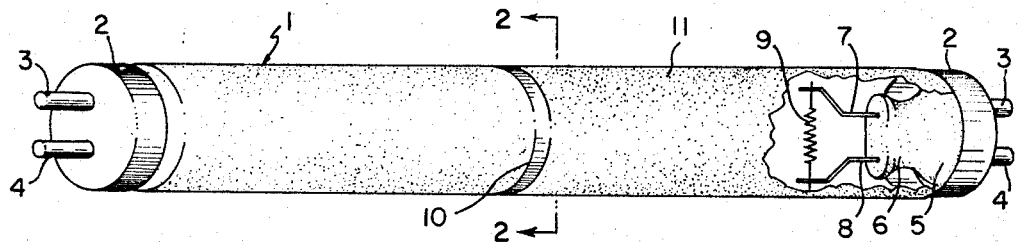
FIG. 1 is a partly cut away view in perspective of one embodiment of a lamp according to the invention.
Figure 2:
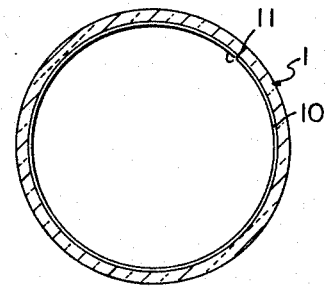
FIG. 2 is a cross-sectional view of the middle of the same lamp.

In FIG. 1, the lamp shown has a sealed glass tube 1, having the usual lamp base 2 at each end, with contact prongs 3, 4 extending from each end thereof. As shown in the cut away portion, a stem flare 5 bearing stem press 6 seals off each end of the lamp tube 1, and the lead-in wires 7, 8 are sealed therethrough to support and make electrical contact with the filamentary cathode 9, which is a coiled-coil tungsten wire, preferably triply-coiled in the usual manner, and carrying the usual electron-emissive coating. The lamp contains a filling of argon or helium and argon, as shown in United States Patent 3,052,813, to issue Sept. 4, 1962 to Gungle et al., or with another suitable gas at low pressure, say 1 or 2 millimeters, and a filling of mercury.

At the middle of the lamp tube 1 is a narrow ring 10 of indium coated onto the glass. The usual coating 11 of fluoroescent phosphor is also on the inside of the glass tube 1, and may extend over the indium ring 10, or the phosphor coating may extend only over the remainder of the tube, and not over the indium, if desired. The lamp will work satisfactorily in either case.

The indium ring 10 is applied to the glass tube 1 before the latter is coated with phosphor. The tube 1 can, for example, be placed in a glass lathe and heated to about 160° C. A pellet of indium of the proper size is picked up on the end of a solid glass rod and held stationary against the middle of the heated bulb, while the latter is rotated in the lathe, until all the indium is transferred to the bulb as a coating in the form of a ring. The exact width of the ring does not seem to be critical, but the narrower the ring is, the less light will be lost by it. Ring widths from ⅛ inch to ½ inch have operated very well; the narrower ring will, of course, be thicker for the same amount of indium.

The indium can also be deposited on the glass as a disc, by taking a disc of indium, for example of about ⅜ inch diameter and a few thousandths of an inch thick, and simply pressing it against the inside surface of the glass bulb, while the latter is gently heated, say to 160° C. Two such discs, near the middle of the bulb, can be used.

For a lamp in a tube about 4 feet long and 1½ inches diameter, generally known in the industry as a 48″ T12 bulb, about 180 milligrams of indium are about right to have in the lamp, with about 90 mg. of mercury. About 25 milligrams of the mercury are generally lost by various reactions during the life of the lamp, so the lamp at the end of life will usually have about 180 mg. of indium and 65 mg. of mercury. This means that the proportions of mercury to mercury-plus-indium will vary from 33% to 23% during the life of the lamp in the example above, yet the lamp will be capable of giving substantially full output over that range of proportions so that its light output will not diminish for that reason during life.

We have discovered that if the original proportions of indium and mercury are such that the resulting alloy will be in both the liquid and solid phases together, that is, in a transition range, forming a sort of "slush," the mercury vapor pressure, and hence the light output of the lamp, will remain nearly constant over a broad range of composition. The same result will follow if the alloy is in the high-indium portion of the liquid phase. The range of useful results extends from about 20% to about 50%.

At about 50%, an abrupt change occurs in the graph of vapor pressure against composition, and smaller indium contents in the indium-mercury alloy will not operate as effectively.

For convenience, I have called mercury-indium compositions within the above range transition compositions, as the range given seems to be for the most part the range in which a transition occurs between the wholly solid and wholly liquid phases.

If the mercury-indium composition is chosen so that it is within the transition range with both the initial and final quantities of mercury, that is with both 90 mg. and 65 mg. in the above example, the lamp will operate at its full output throughout life.

The presence of at least some of the alloy in a liquid state is necessary to the proper reabsorption into the alloy of the mercury evaporated from it. When the alloy is in the solid state, the reabsorption of the mercury into it on cooling is less effective, and the alloy eventually loses its mercury. Indium, unlike most other metals, forms alloys with mercury which are at least partially in the liquid state; some other metals, such as cadmium do not have such liquid phases with mercury at the operating temperature of the tube, and hence do not reabsorb it readily at such temperatures.

In addition to fixing the indium-mercury content so that the lamp will operate satisfactorily throughout its life despite the normal depreciation in mercury content, it is also desirable to have initial and final mercury contents such that the lamp will operate close to maximum output over the range of ambient temperatures in which the lamp is likely to be used.

Figure 3:
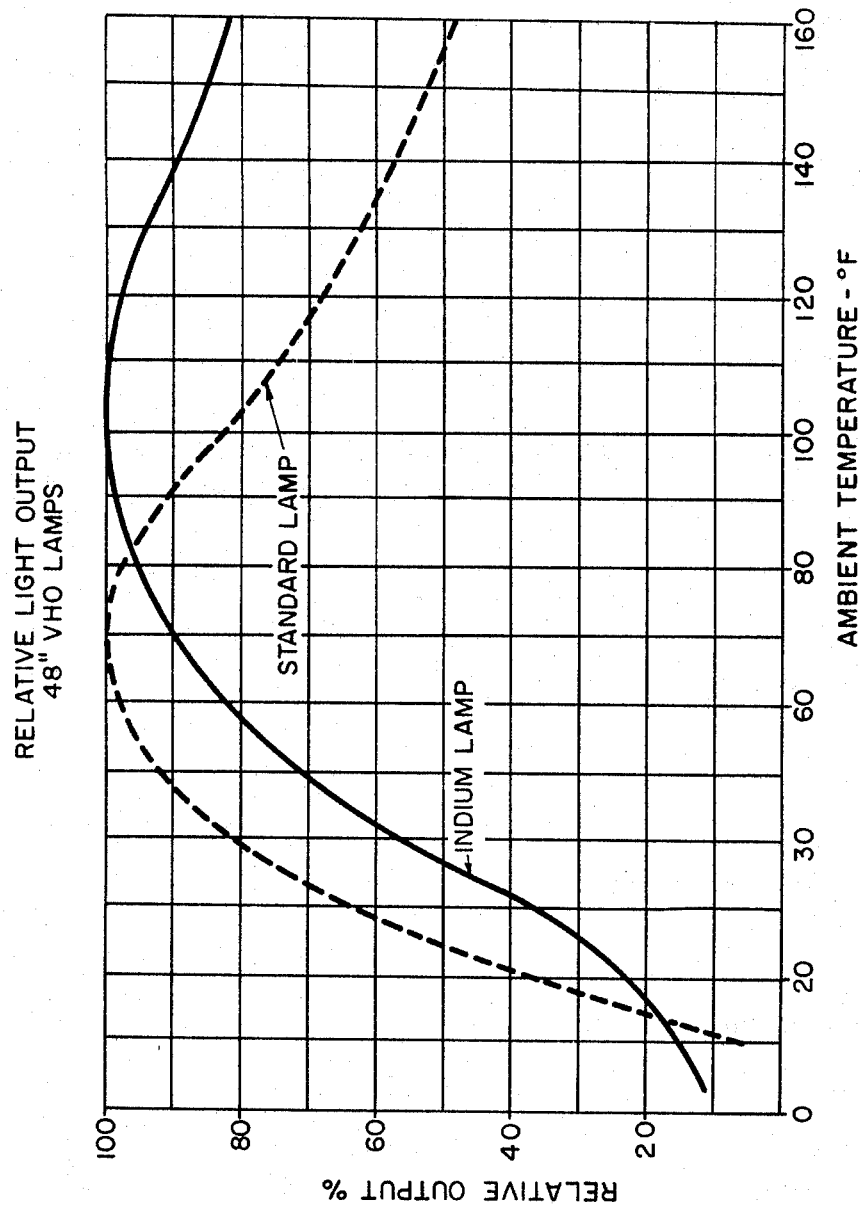
FIG. 3 is a graph of the relative light outputs of the lamp versus the ambient temperature.

The differences in light output at various ambient temperatures is shown in the graph of FIG. 3 for a standard tubular fluorescent lamp of the very high output type, in which heat shields are used between each electrode and the corresponding end of the lamp, and a tubular fluorescent lamp without such shields but with a ring of indium on the inside of the glass tube at its middle. Each of the lamps was four feet long and 1½ inches in diameter, that is it was in a 48″ T12 tube. The wattage input to each lamp was the same, about 100 watts. But whereas the "standard lamp" had a shield between each electrode and the corresponding end of the lamp, to keep the ends cool and the mercury pressure low, and no indium, the other lamp had an indium ring as described, and no shields behind the electrodes. The absence of the shields permitted the electrodes to be moved nearer the corresponding ends of the lamp to the position they occupy in a normal 40-watt T12 fluorescent lamp, thereby increasing the arc length by about 1½ inches and increasing the light output for that reason. As a result, despite some absorption of light by the indium ring, the total light output was greater in the indium lamp than in the standard 100 watt 48T12 fluorescent lamp.

The above effect does not shown in the curves of FIG. 3, however, because the curves are "normalized" that is the maximum output of each is taken as 100% for the corresponding curve, so both curves show their maximum output as 100%. If the actual lumens output were plotted, the increased output of the indium lamp would be apparent.

The graphs of FIG. 3 show, however, that the peak output of the indium lamp occurs at about 35° higher ambient temperature than the other lamp. The greater broadness of the indium lamp curve is quite apparent. While the standard lamp gives 90% or more brightness over a temperature range of only about 40 Fahrenheit degrees, the indium lamp's region of 90% or more brightness extends over a range of nearly 70 Fahrenheit degrees.

What I claim is:
1. An electrical discharge lamp comprising an enclosing envelope at least part of which is light-transmissive, electrodes in said envelope, a small quantity of mercury in said envelope, and a ring of indium on the inside surface of said envelope near the middle thereof.
2. The lamp of claim 1, and a phosphor coating on the inside surface of said envelope and over said ring.

References Cited

UNITED STATES PATENTS 3,007,071 10/1961 Lompe et al. _____ 313—109 X
3,152,278 10/1964 Dzierqwa et al. ____ 313—109 X JAMES W. LAWRENCE, *Primary Examiner.*

JOHN W. HUCKERT, DAVID J. GALVIN, *Examiners.*

C. R. CAMPBELL, *Assistant Examiner.*